US005903800A

United States Patent [19]

Stern et al.

[11] Patent Number: 5,903,800

[45] Date of Patent: May 11, 1999

[54] ELECTROSTATOGRAPHIC REPRODUCTION APPARATUS AND METHOD WITH IMPROVED DENSITOMETER

[75] Inventors: Philip A. Stern, Spencerport; James D. Anthony, Victor; Paul E. Thompson, Webster, all of N.Y.

[73] Assignee: Eastman Kodak Company, Rochester, N.Y.

[21] Appl. No.: 09/090,746

[22] Filed: Jun. 4, 1998

[51] Int. Cl.[6] .......................... G03G 15/00; G01N 21/00

[52] U.S. Cl. ............................... 399/74; 399/49; 356/432

[58] Field of Search ................................ 399/74, 38, 49, 399/58, 60; 118/689, 691, 693, 694; 250/353, 341; 356/434, 445, 446, 448, 379, 432

[56] References Cited

U.S. PATENT DOCUMENTS

| | | | |
|---|---|---|---|
| 3,998,538 | 12/1976 | Urso et al. | 399/73 |
| 4,473,029 | 9/1984 | Fritz et al. | 399/236 |
| 4,546,060 | 10/1985 | Miskinis et al. | 399/267 |
| 5,083,161 | 1/1992 | Borton et al. | 399/49 |
| 5,204,538 | 4/1993 | Genovese | 356/448 X |
| 5,519,497 | 5/1996 | Hubble, III et al. | 356/445 |
| 5,649,266 | 7/1997 | Rushing | 399/59 |
| 5,666,194 | 9/1997 | Denton | 399/74 X |

*Primary Examiner*—Arthur T. Grimley
*Assistant Examiner*—Hoan Tran
*Attorney, Agent, or Firm*—Norman Rushefsky

[57] ABSTRACT

An electrostatographic recording apparatus includes an endless recording member upon which toner images are recorded. A densitometer is provided for measuring density of a toned area on the recording member. The densitometer includes a light emitting and/or light sensitive component that is located in an internal space confined by the endless recording member. The densitometer further includes a slidable support upon which the component is mounted in facing relationship with and proximate to an internal facing portion of the recording member. A stationary mounting structure is attached to a film core upon which the film-like recording member is supported. The slidable support is received within the stationary mounting structure. An electrical circuit is electrically connected to the component and is mounted on a side of the slidable support that is opposite in facing direction to that of the component.

16 Claims, 6 Drawing Sheets

ELECTROSTATOGRAPHIC REPRODUCTION APPARATUS AND METHOD WITH IMPROVED DENSITOMETER

FIELD OF THE INVENTION

This invention relates to electrostatographic reproduction apparatus and more particularly to improved apparatus for controlling the location and reliability of a density measurement device.

BACKGROUND OF THE INVENTION

As noted in U.S. application Ser. No. 08/970,832 filed in the names of Regelsberger et al, control of process conditions in an electrophotographic apparatus can be provided by forming toned density patches on the photoconductors. Such patches are formed by exposing, for example, interframe portions of the photoconductor to exposure light from the imaging source and developing same with the development station under appropriate electrical bias. By measuring the density of the patches, it can be determined whether adjustments are needed to one of the known operating process control parameters such as primary charger setpoint, exposure setpoint and development bias.

The density of the developed toned patches can be measured using a densitometer. One type, a transmission densitometer, projects light, visible or infrared, through an object onto a photodiode. The amount of energy reaching the photodiode determines the voltage output from the device.

In a copier/printer, the photoconductor passes between the light source and the photodiode. When the photodiode has toner on the surface, the amount of light reaching the photodiode is decreased. This changes the voltage output from the device, proportional to the optical density of the toner on the surface. Based on this voltage, the amount of toner applied to the photoconductor can be varied as required in order to obtain consistent image quality.

Another type of densitometer as described in U. S. Pat. No. 5,519,497 uses reflected flux rather than transmitted flux to determine density.

As these machines are used, contamination can build up on the surface of the photodiode, changing the voltage output. Typically, these devices are permanently fixed to the structure below the photoconductor, such that the photoconductor must be removed in order to clean the photodiode.

It is thus an object of this invention to provide a new and improved apparatus for locating the densitometer which eliminates the need to remove the photoconductor. This reduces the time required to perform maintenance on the machine, as well as reduces the risk of damage to the photoconductor. Other objects and advantages of the invention will become apparent from a reading of the specification taken in conjunction with the accompanying drawing.

SUMMARY OF THE INVENTION

In accordance with a first aspect of the invention there is provided an electrostatographic recording apparatus comprising an endless recording member upon which toner images are recorded; a densitometer for measuring density of a toned area on the recording member, the densitometer including a light emitting or light sensitive component, said component being located in an internal space confined by the endless recording member, the densitometer further including a slidable support upon which said component is mounted in facing relationship with and proximate to an internal facing portion of the recording member, a stationary mounting structure, the slidable support being received within the stationary mounting structure, and an electrical circuit that is electrically connected to said component and mounted on a side of said slidable support that is opposite in facing direction to that of the component.

In accordance with a second aspect of the invention there is provided for use in an electrostatographic recording apparatus including an endless recording member upon which toner images are formed, a method of locating a densitometer in position for determining density of a toned area on the recording member, the method comprising providing a densitometer including a light emitting or light sensitive component, the component being located in an internal space confined by the endless recording member, the densitometer further including a slidable support upon which said component is mounted in facing relationship with and proximate to an internal facing portion of the recording member, a stationary mounting structure and the slidable support being received within the stationary mounting structure, and an electrical circuit that is electrically connected to said component and is mounted on a side of the slidable support that is opposite in facing direction to that of the component; moving the slidable support within the stationary mounting structure; and locking the slidable support in a position for determining density of the toned area on the recording member.

In accordance with a third aspect of the invention there is provided a densitometer for measuring density of a toned area on a recording member, the densitometer including a light sensitive component, said component being adapted to be located in an internal space confined by an endless recording member; the densitometer further including a slidable support upon which said component is mounted for placement in facing relationship with and proximate to and an internal facing portion of the recording member; a stationary mounting structure for mounting structure for mounting to an electrostatographic recording apparatus, the slidable support being receivable within the stationary mounting structure; and an electrical circuit that is electrically connected to said component and mounted on a side of said slidable support that is opposite in facing direction in that of the component.

BRIEF DESCRIPTION OF THE DRAWINGS

The subsequent description of the preferred embodiments of the present invention refers to the attached drawings wherein.

DETAILED DESCRIPTION OF THE INVENTION

Because apparatus of the general type described herein are well known the present description will be directed in particular to elements forming part of, or cooperating more directly with, the present invention. While the invention will be described with reference to an electrophotographic system the invention can also be used in an electrographic system too and thus broadly in an electostatographic system.

Figure 1:
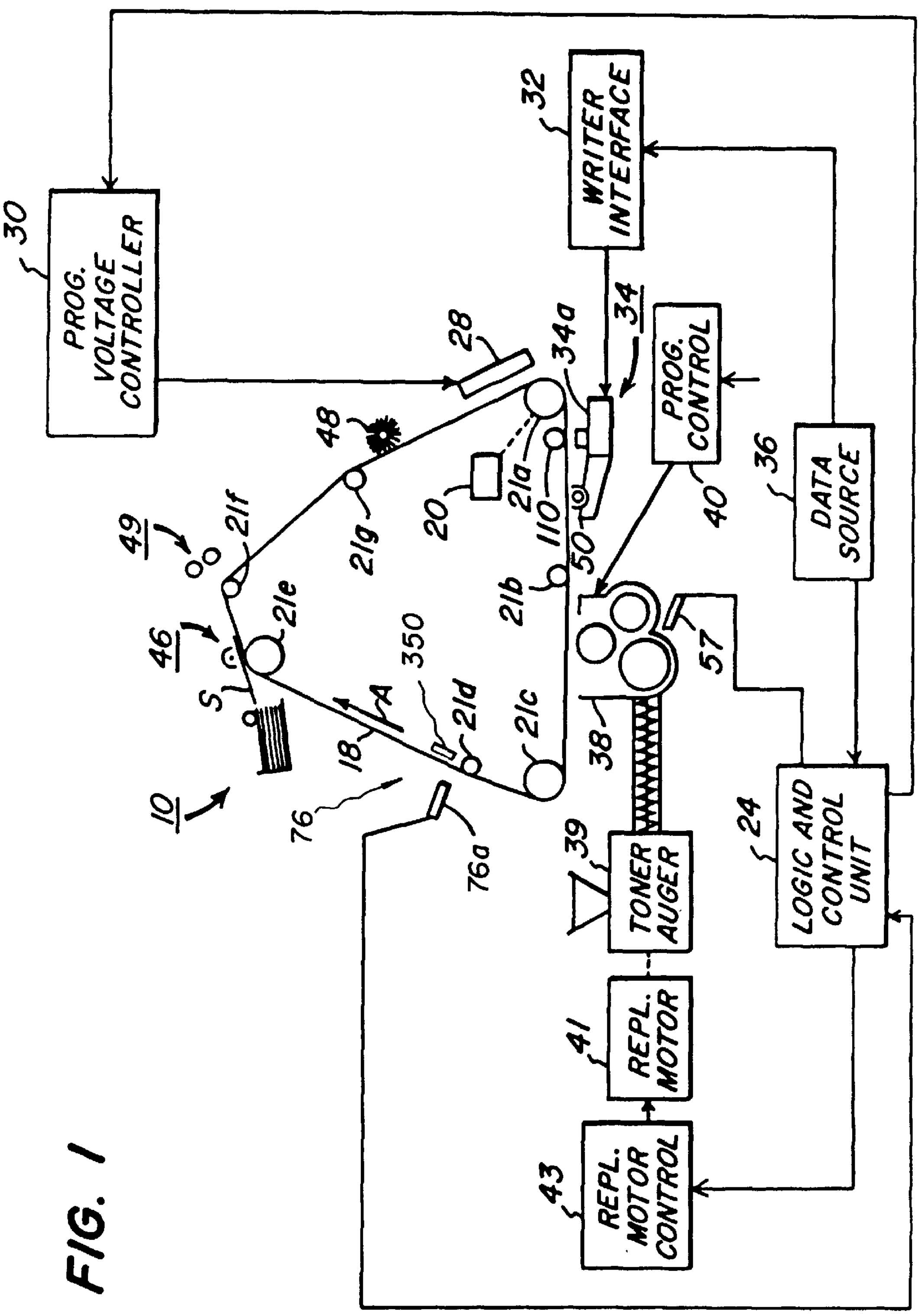
FIG. 1 is a side elevational view in schematic form of an electrostatographic apparatus that is used in accordance with a preferred embodiment of the invention.

With reference to the electrophotographic copier and/or printer machine 10 as shown in FIG. 1, a moving recording member such as photoconductive belt 18 is entrained about a plurality of rollers or other supports 21*a–g* one or more of which are driven by a motor 20 so as to advance the belt in a direction indicated by an arrow A past a series of work stations of the copier/printer machine. A logic and control unit (LCU) 24, which has a digital computer, has a stored program for sequentially actuating the work stations in response to signals from various sensors and encoders as is well known.

Briefly, a primary charging station 28 sensitizes belt 18 by applying a uniform electrostatic charge of predetermined primary voltage $V_O$ to the surface of the belt. The output of the charging station is regulated by a programmable voltage controller 30, which is in turn controlled by LCU 24 to adjust primary voltage $V_O$ for example through control of electrical potential ($V_{grid}$) to a grid that controls movement of corona charges from charging wires to the surface of the recording member as is well known. Other known forms of chargers, including roller chargers, may also be used.

At an exposure station 34, projected light from a write head 34*a* dissipates the electrostatic charge on the photoconductive belt to form a latent image of a document to be copied or printed. The write head preferably has an array of light-emitting diodes (LEDs) or other light source such as a laser or other spatial light modulator for exposing the photoconductive belt picture element (pixel) by picture element with a regulated intensity and exposure, $E_o$. Alternatively, the exposure may be by optical projection of an image of a document or a patch onto the photoconductor.

Where an LED or other electro-optical exposure source or writer is used, image data for recording is provided by a data source 36 for generating electrical image signals. The data source 36 may be a computer, a document scanner, a memory, a data network, etc. Signals from the data source and/or LCU may also provide control signals to a writer interface 32 for identifying exposure correction parameters in, for example, a look-up table (LUT) for use in controlling image density. Travel of belt 18 brings the areas bearing the latent charge images into a development station 38. The development station has one (more if color) magnetic brushes in juxtaposition to, but spaced from, the travel path of the belt. Magnetic brush development stations are well known. For example, see U.S. Pat. Nos. 4,473,029 to Fritz et al and 4,546,060 to Miskinis et al. Other types of development stations may be used as is well known and plural development stations may be provided for developing images in plural colors or with toners of different physical characteristics.

LCU 24 selectively activates the development station in relation to the passage of the image areas containing latent images to selectively bring the magnetic brush into engagement with or a small spacing from the belt. The charged toner particles of the engaged magnetic brush are attracted imagewise to the latent image pattern to develop the pattern.

As is well understood in the art, conductive portions of the development station, such as conductive applicator cylinders, act as electrodes. The electrodes are connected to a variable supply of D.C. potential $V_B$ regulated by a programmable controller 40. Details regarding the development station are provided as an example, but are not essential to the invention.

A transfer station 46 as is also well known is provided for moving a receiver sheet S into engagement with the photoconductive belt in register with the image for transferring the image to a receiver. Alternatively, an intermediate member may have the image transferred to it and the image may then be transferred to the receiver. A cleaning station 48 is also provided subsequent to the transfer station for removing toner from the belt 18 to allow reuse of the surface for forming additional images. In lieu of a belt a drum photoconductor or other structure for supporting an image may be used. After transfer of the unfixed toner images to a receiver sheet, such sheet is detacked from the belt and transported to a fuser station 49 where the image is fixed.

The LCU provides overall control of the apparatus and its various subsystems as is well known. Programming commercially available microprocessors is a conventional skill well understood in the art.

Figure 2:
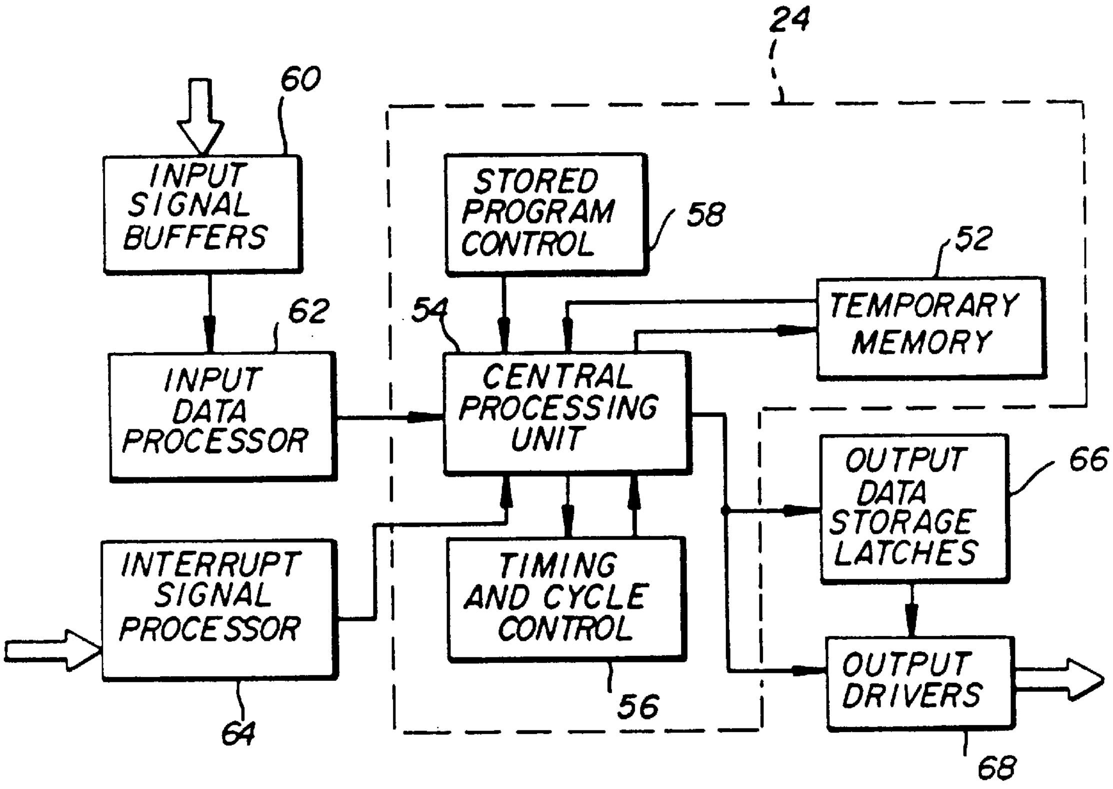
FIG. 2 is a block diagram of a logic and control unit for controlling the apparatus of FIG. 1.

Referring to FIG. 2, a block diagram of a typical LCU 24 is shown. The LCU comprises temporary data storage memory 52, central processing unit 54, timing and cycle control unit 56, and stored program control 58. Data input and output is performed sequentially through or under program control. Input data are applied either through input signal buffers 60 to an input data processor 62 or through an interrupt signal processor 64. The input signals are derived from various switches, sensors, and analog-to-digital converters that are part of the apparatus 10 or received from sources external to machine 10.

The output data and control signals are applied directly or through storage latches 66 to suitable output drivers 68. The output drivers are connected to appropriate subsystems.

Process control strategies generally utilize various sensors to provide real-time control of the electrostatographic process and to provide "constant" image quality output from the user's perspective.

One such sensor may be a densitometer 76 to monitor development of test patches in non-image areas of photoconductive belt 18, as is well known in the art, see for example U. S. Pat. No. 5,649,266. The densitometer is intended to insure that the transmittance or reflectance density of a toned patch on the belt is maintained. The densitometer may be comprised of an infrared LED 76*a* which shines light through the belt or is reflected by the belt onto a photodiode 350. The photodiode generates a voltage proportional to the amount of light received. This voltage is compared to the voltage generated due to transmittance or reflectance of a bare patch, to give a signal, $D_{out}$ representative of an estimate of toned density.

This signal $D_{out}$, may be used to adjust process parameters $V_O$, $E_O$, or $V_B$; and, to assist in the maintenance of the proper concentration of toner particles in the developer mixture by having the LCU provide control signals to a replenisher motor control 43 which controls replenisher motor 41 that drives a toner auger 39 for feeding new toner particles into the development station 38. A toner concentration monitor probe 57 provides signals to the LCU about relative concentration of toner particles with respect to carrier particles in the developer mix.

A second sensor useful for monitoring process parameters is an electrometer probe 50 which is mounted at a location preferably downstream of the corona charging station 28 relative to the direction of the movement of the belt 18 which direction is indicated by the arrow A. In the example illustrated in FIG. 1 the electrometer probe 50 is mounted immediately downstream of the writehead 34_a_. The apparatus for supporting the electrometer probe in position for sensing charge on the photoconductive member or belt 18 and for providing for calibration of the electrometer probe is now U.S. application Ser. No. 08/970,832 on Nov. 14, 1997 in the names of Stern et al.

Figure 3:
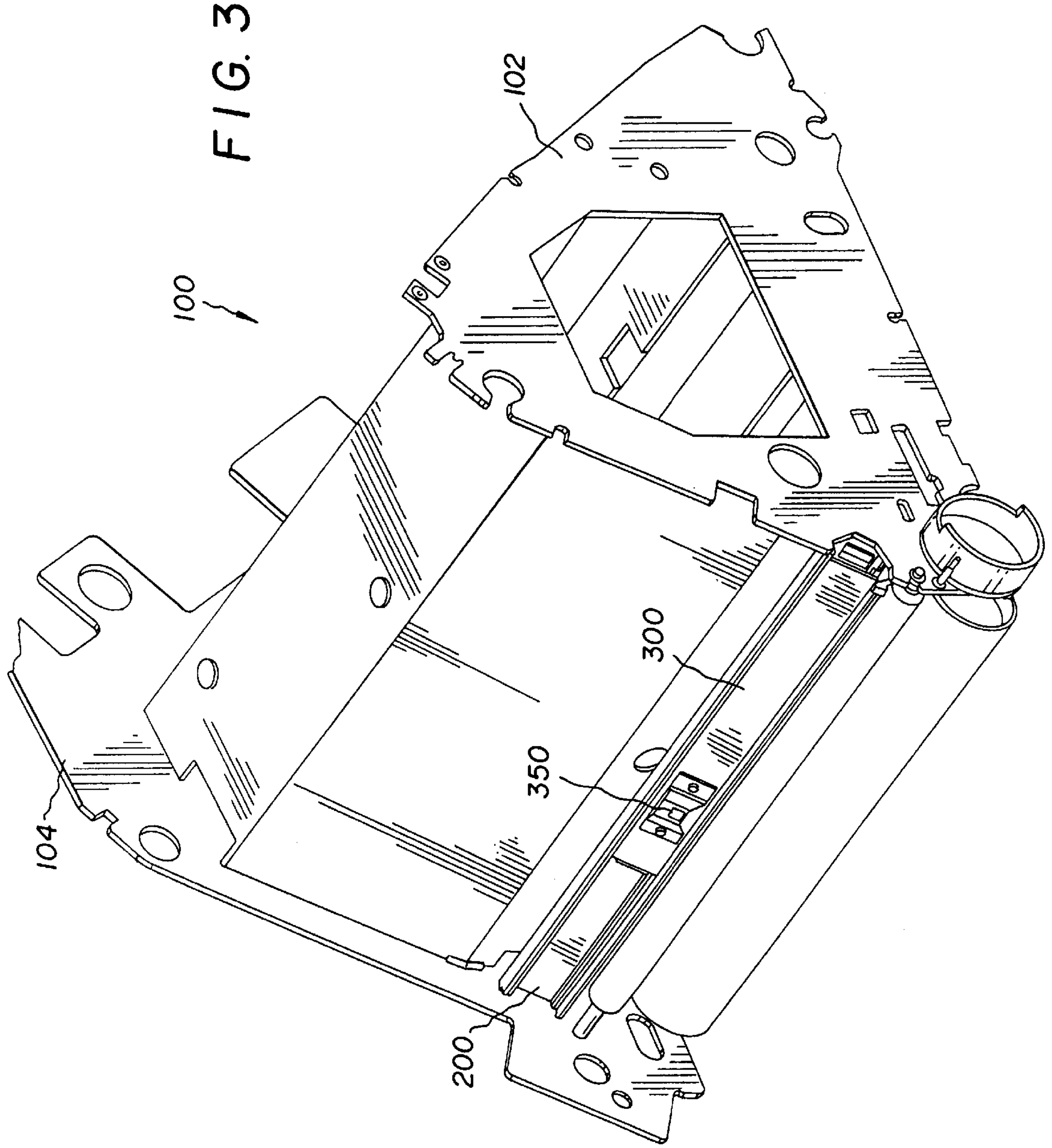
FIG. 3 is a perspective view of a preferred densitometer that is used in the apparatus of FIG. 1 and illustrating a film core upon which the densitometer is mounted.

With reference now to FIG. 3 there is illustrated a film core 100 upon which the various rollers 21_a–g_ are mounted. The film core includes a recess into which a densitometer mounting structure 200 is seated and serviced. The film core includes end plates 102, 104 which are connected to the machine frame. The mounting structure 200 is longitudinally extending in a direction cross-track of the process moving (in-track) direction of the web and located between the two endplates. The mounting structure is positioned to locate the densitometer between the development station and the transfer station. However,this is merely a convenient location for the densitometer when density patches are formed in interframes and this location is not critical.

Figure 4:
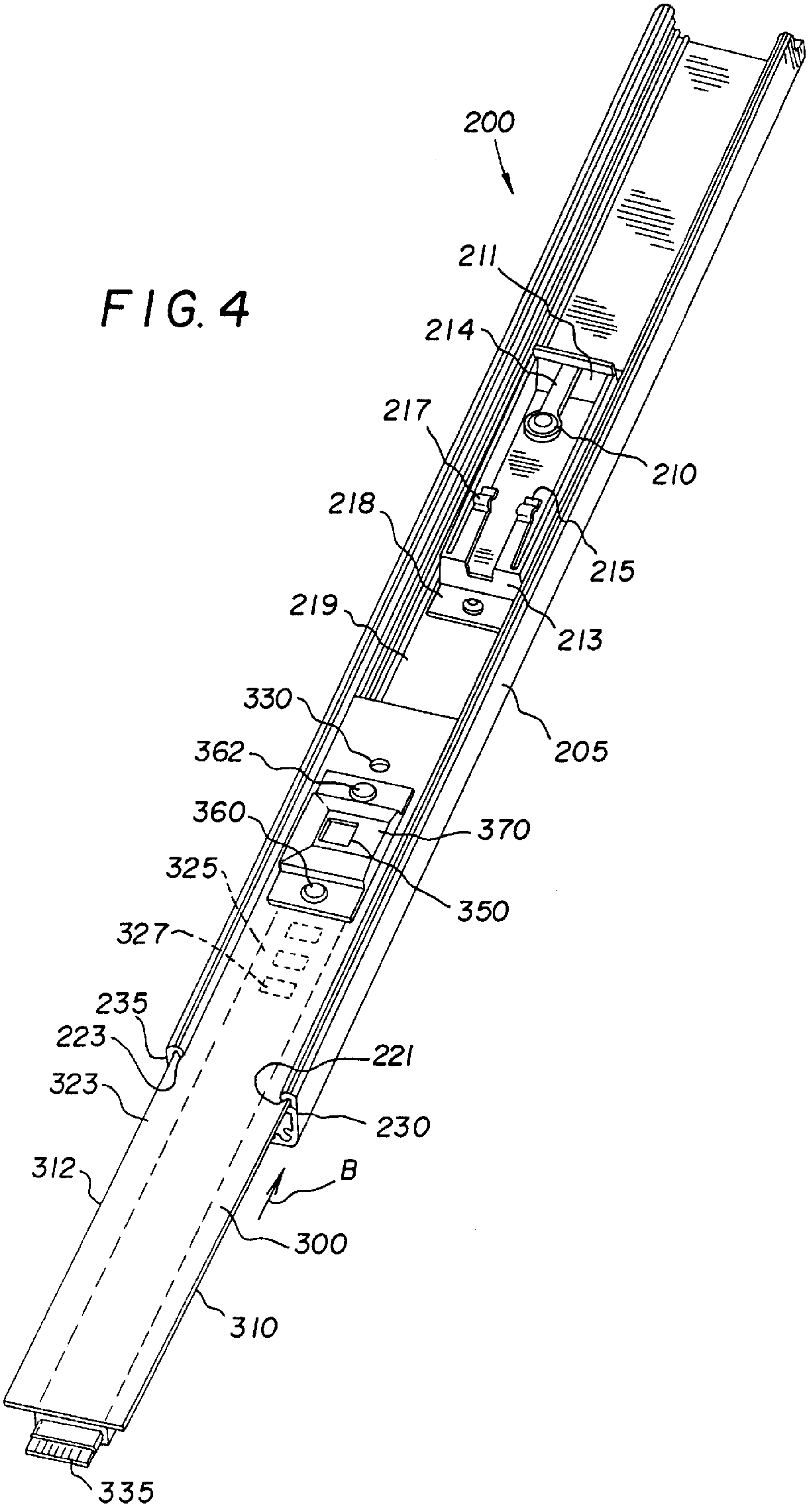
FIG. 4 is a perspective view of the densitometer in a partially removed state, showing the locking device and locating feature.
Figure 5:
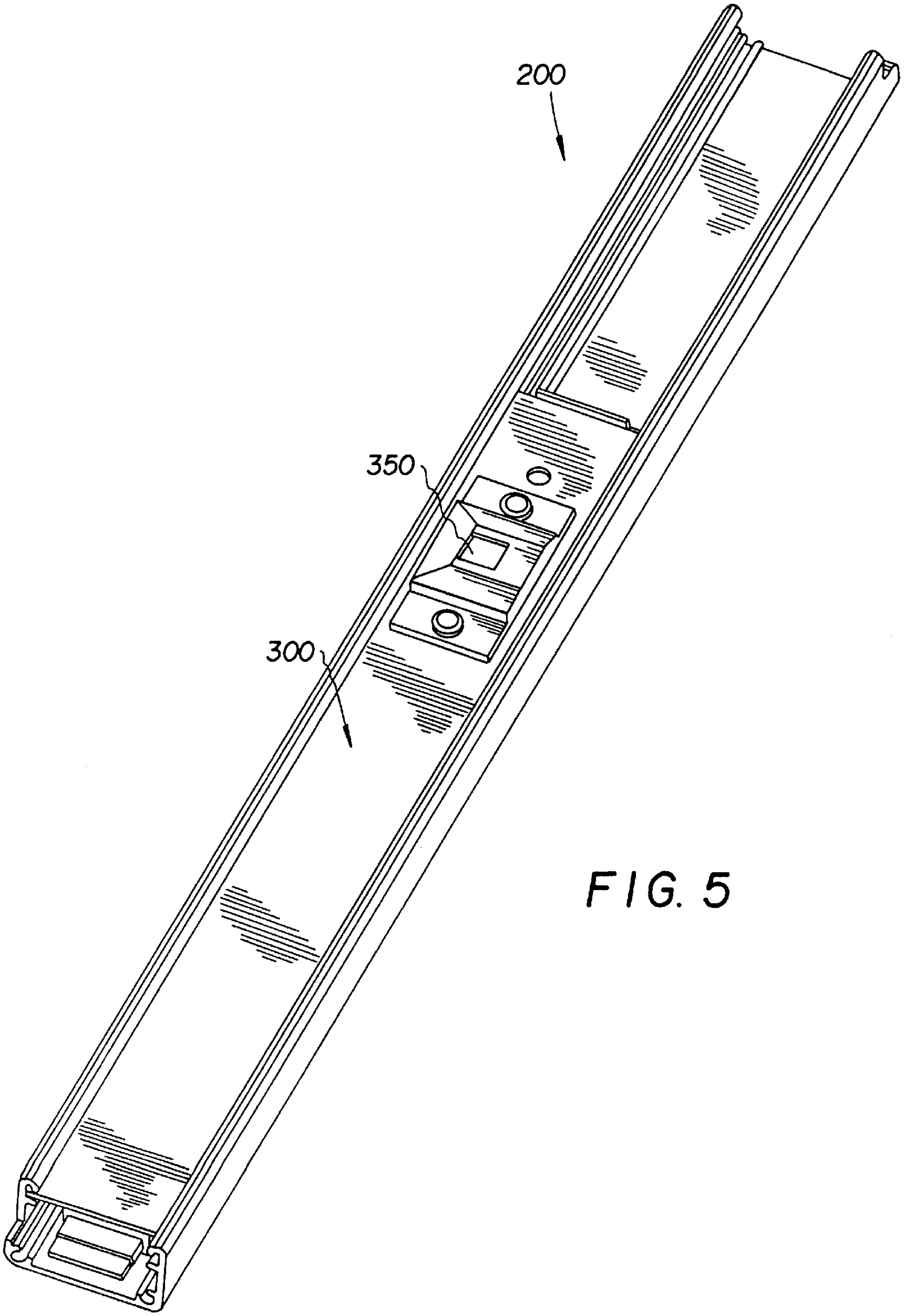
FIG. 5 is a perspective view of the densitometer of FIG. 3.

With reference now to FIGS. 4 and 5 additional details of the densitometer mounting structure (DMS) 200 and the densitometer circuit board (DCB) 300 are provided. The DMS 200 comprises an aluminum extrusion that forms a channel to provide a recess 219 into which the DCB 300 may be positioned. Side walls 230, 235 of the DMS include "F" shaped structures into which edges 310, 312 of the DCB 300 are located and guided for movement of the DCB along the longitudinal direction of the DMS 200.

The DMS 200 includes location structures for positioning the DCB 300. These locating structures include a detent dog 210 which is cantileveredly supported by a resilient arm 214 which extends from an upstanding wall 211 residing in the channel. The detent dog 210 is adapted to set within a through hole 330 formed in the DCB 300 when the DCB is moved within the channel to its terminal position wherein the photodiode 350 is operational to sense density patches on the photoconductor. To further locate the DCB 300 within a proper reference plane relative to the photoconductor there are provided cantilevered prong springs 215, 217 which extend from upstanding wall 213. The prong springs 215, 217 engage the underside of the DCB and spring bias the DCB against locating surfaces 221, 223 that are downwardly depending appendages to the "F"-shaped structures 230, 235. Thus when the DCB 300 is advanced in the direction of the arrow it eventually is locked in position when the detent dog 210 seats within hole 330 and the prong springs 215, 217 spring bias the DCB against the locating surfaces 221, 223. The photodiode is now properly located in a plane relative to the photoconductor web.

The DCB 300 includes a photodiode assembly package 370 which includes a photodiode 350. The package 370 is mounted on the DCB 300 so as to face towards the photoconductive web 18. Plastic rivets 360, 362 mechanically attach the photodiode assembly to the DCB. On the opposite face of the DCB 300 there is provided electrical components such as integrated circuits 327 and other electrical components that provide power and control of the photodiode 350. The photodiode 350 is positioned to sense light emitted from an LED 76_a_ which is continuously illuminated in response to the power from the DCB 300 unit which allows toned density patch readings to be made. Light from the LED 76_a_ is transmitted through the toned density patch and the relatively transparent web 18 to the photodiode 350. If desired the positions of the components (LED and photodiode) of the densitometer may be reversed and the LED may be mounted on this board. Alternatively, both components may be mounted on the DCB when a reflection densitometer is employed. An electrical connector 335 is mounted at one end of the DCB 300 to which a wire harness (not shown) may be connected for connecting the electrical components on the DCB 300 to the LCU and an electrical power supply.

Figure 6:
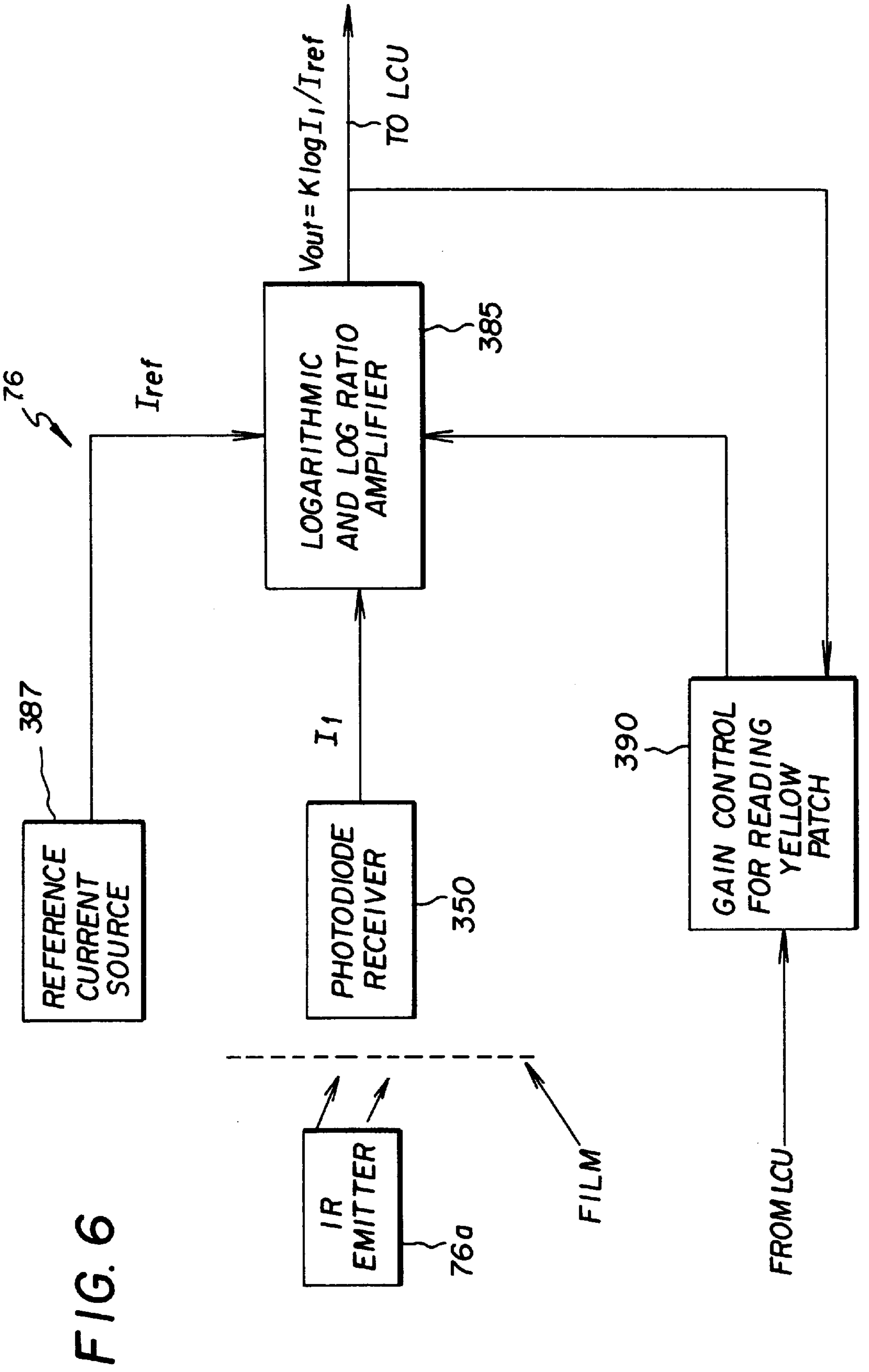
FIG. 6 is a block diagram of a circuit for the densitometer.

With reference to FIG. 6, the densitometer electrical circuitry includes in addition to the IR emitter 76_a_ and photodiode receiver 350 a logarithmic and log ratio amplifier 385. Amplifier 385 may be in the form of an integrated circuit such as a Burr-Brown Log 100 circuit. This circuit has at one input a reference current source $I_{ref}$ generated by a current source generator 387. A second input to circuit 385 is a current signal $I_1$ that is related to light sensed by the photodiode receiver 350. The light sensed is light that was output by the emitter 76_a_ and which passed through a patch of toned density. In response to this light the photodiode receiver 350 generates the signal $I_1$. $I_1$ is thus related to the light originally emitted by the emitter less that which was lost by passing through both the toned patch and the photoconductive web 18. A separate reading may be made at an untoned area of the web to determine light lost just through the untoned web itself. The amplifier, in response to these inputs provides voltage output signals $V_{OUT}=K \log I_1/I_{ref}$ to the LCU. These voltage output signals are thus used as density related measurements.

Where additional other color development stations other than black toner are in the machine, provision may also be made for forming toned density patches in the other color, for example yellow, and a signal from an adjustment gain controller 390 may be provided as an input to the amplifier 385 for using a different gain value K when density of say a yellow patch is to be sensed.

There is tendency of toner particles to become airborne within the machine and settle at various locations including on the photodiode 350. In order to periodically provide maintenance to the photodiode to remove the toner particles therefrom it is desirable to provide access of a machine service person. In order to provide convenient access to the DCB 300 it may be grabbed at the end having the electrical harness connector and slid in a direction opposite to that of arrow B so that the DCB 300 is removed either entirely from the DMS 200 or the photodiode is sufficiently clear of the web 18 to facilitate cleaning by the service person. The detent dog and recess are structured so that movement of the DCB 300 in the direction opposite to that of arrow B causes the detent dog 210 to be downwardly cammed and removed from locking engagement with the recess 330 thereby freeing the DCB for removal.

Circuitry 325 for providing power, control signals and sensing of the output of the photodiode are provided on the opposite surface 323 of the DCB; i.e. opposite to the surface to which the photodiode receiver assembly 350 is mounted. This circuitry is electrically connected to the photodiode 350 and may include integrated circuits 327. The advantage to this arrangement is that the circuitry including leadlines is protected from contamination by toner and carrier particles and other contaminants that become airborne in the copier/printer. Additionally, by having the circuitry mounted on the opposite surface of the DCB there can be provided a short distance for transmission of low current signals form the photodiode receiver to the amplifier 385 which improves signal to noise considerations.

The invention has been described in detail with particular reference to certain preferred embodiments thereof, but it will be understood that variations and modifications can be effected within the spirit and scope of the invention.

What is claimed is:

1. An electrostatographic recording apparatus comprising:

an endless recording member upon which toner images are recorded;

a densitometer for measuring density of a toned area on the recording member, the densitometer including a light emitting or light sensitive component, said component being located in an internal space confined by the endless recording member, the densitometer further including a slidable support upon which said component is mounted in facing relationship with and proximate to an internal facing portion of the recording member, a stationary mounting structure, the slidable support being received within the stationary mounting structure, and an electrical circuit that is electrically connected to said component and mounted on a side of said slidable support that is opposite in facing direction to that of the component.

2. The apparatus of claim 1 and wherein a detent dog is provided on the mounting structure and a recess is provided on the slidable support for locating the slidable support in a terminal locking position.

3. The apparatus of claim 2 wherein the mounting structure includes a cantilevered prong spring, and locating surfaces for engaging the slidable support the prong spring biasing the slidable support against the locating surfaces.

4. The apparatus of claim 3 wherein the slidable support is a circuit board.

5. The apparatus of claim 4 wherein the circuit board includes at one end thereof an electrical connector for use in connecting the electrical components to an electrical harness.

6. The apparatus of claim 5 wherein the stationary mounting structure is an extrusion having opposed "F"-shaped upstanding structures one on each of two sides of the mounting structure, and the slidable support has opposed edges each of which slides within a space defined by a respective one of the "F"-shaped upstanding structures.

7. The apparatus of claim 1 wherein the stationary mounting structure is an extrusion having opposed "F"-shaped upstanding structures one on each of two sides of the mounting structure, and the slidable support has opposed edges each of which slides within a space defined by a respective one of the "F"-shaped upstanding structures.

8. The apparatus of claim 7 wherein the stationary mounting structure is mounted upon a film core and the endless recording member is a web that moves about the film core.

9. The apparatus of claim 1 wherein the mounting structure includes a cantilevered prong spring and locating surfaces for engaging the slidable support, the prong spring biasing the slidable support against the locating surfaces.

10. The apparatus of claim 1 wherein the slidable support is a circuit board.

11. The apparatus of claim 1 wherein the stationary mounting structure includes means for locating the component relative to a plane of the endless recording member.

12. In an electrostatographic recording apparatus including an endless recording member upon which toner images are formed, a method of locating a densitometer in position for determining density of a toned area on the recording member, the method comprising:

providing a densitometer including a light emitting or light sensitive component, the component being located in an internal space confined by the endless recording member, the densitometer further including a slidable support upon which said component is mounted in facing relationship with and proximate to an internal facing portion of the recording member, a stationary mounting structure and the slidable support being received within the stationary mounting structure, and an electrical circuit that is electrically connected to said component and is mounted on a side of the slidable support that is opposite in facing direction to that of the component;

moving the slidable support within the stationary mounting structure; and locking the slidable support in a position for determining density of the toned area on the recording member.

13. The method of claim 12 wherein the stationary mounting structure is an extrusion having opposed "F"-shaped upstanding structures one on each of two sides of the mounting structure, and the slidable support has opposed edges each of which slides within a space defined by a respective one of the "F"-shaped upstanding structures.

14. The method of claim 13 wherein the component is a light sensitive component and receives light and generates a signal to said circuit in response to receiving of light.

15. The method of claim 12 wherein the component is a light sensitive component and receives light and generates a signal to said circuit in response to receiving of light.

16. A densitometer for use in the method of claim 12 for measuring density of a toned area on a recording member, the densitometer including a light sensitive component, said component being adapted to be located in an internal space confined by an endless recording member; the densitometer further including a slidable support upon which said component is mounted for placement in facing relationship with and proximate to an internal facing portion of the recording member; a stationary mounting structure for mounting to an electrostatographic recording apparatus, the slidable support being receivable within the stationary mounting structure; and an electrical circuit that is electrically connected to said component and mounted on a side of said slidable support that is opposite in facing direction to that of the component.

* * * * *